US 11,760,365 B2

(12) United States Patent
Unger

(10) Patent No.: US 11,760,365 B2
(45) Date of Patent: Sep. 19, 2023

(54) ACTIVE CHASSIS CONTROL FOR A MOTOR VEHICLE

(71) Applicant: AUDI AG, Ingolstadt (DE)

(72) Inventor: Andreas Unger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/949,404

(22) Filed: Sep. 21, 2022

(65) Prior Publication Data

US 2023/0166744 A1 Jun. 1, 2023

(30) Foreign Application Priority Data

Nov. 26, 2021 (DE) .......................... 102021131065.2

(51) Int. Cl.
*B60W 50/00* (2006.01)
*B60G 17/016* (2006.01)

(52) U.S. Cl.
CPC ....... *B60W 50/0098* (2013.01); *B60G 17/016* (2013.01); *B60G 2400/10* (2013.01); *B60G 2400/206* (2013.01)

(58) Field of Classification Search
CPC ............. B60W 50/0098; B60G 17/016; B60G 2400/10; B60G 2400/206
See application file for complete search history.

(56) References Cited

U.S. PATENT DOCUMENTS 5,322,320 A 6/1994 Sahashi et al.
6,298,294 B1 * 10/2001 Murata ................ B60G 17/018
280/5.515

(Continued)

FOREIGN PATENT DOCUMENTS

DE 4029034 A1 3/1992
DE 4119323 A1 12/1992

(Continued)

OTHER PUBLICATIONS

Search Report dated Jul. 7, 2022, in connection with corresponding German Application No. 102021131065.2 (8 pp., including machine-generated English translation).

(Continued)

*Primary Examiner* — Toan C To
(74) *Attorney, Agent, or Firm* — Maier & Maier, PLLC

(57) ABSTRACT

An active chassis control for a motor vehicle with an adaptive control circuit for reducing body vibrations ($A_{actual}$) of the motor vehicle, in which a control unit is integrated, which, depending on a current body vibration ($A_{actual}$) or a parameter correlating therewith (a), controls a chassis actuator. The control unit is followed by an adaptive unit which adapts an actuating signal (S) generated by the control unit with a driving speed-dependent scaling factor (f(v)), in particular by generating an adapted actuating signal (S') with which the chassis actuator can be controlled. Depending on the situation, a factor allowance ($\Delta f$) can be added to the driving speed-dependent scaling factor (f(v)) in the event of a significantly greater body vibration ($A_o$) in order to effectively dampen the significantly greater body vibration ($A_o$).

20 Claims, 4 Drawing Sheets

(56) References Cited

U.S. PATENT DOCUMENTS

| | | | |
|---|---|---|---|
| 11,440,366 B1* | 9/2022 | O'Shea | B60G 17/08 |
| 2002/0162389 A1* | 11/2002 | Yokota | G01H 1/14 |
| | | | 73/146 |
| 2005/0049761 A1* | 3/2005 | Kataoka | B60W 10/18 |
| | | | 702/56 |
| 2013/0245888 A1* | 9/2013 | Kikuchi | B60G 17/06 |
| | | | 701/38 |
| 2015/0039199 A1* | 2/2015 | Kikuchi | B60G 17/0164 |
| | | | 701/70 |
| 2015/0123624 A1* | 5/2015 | Ookawa | B60W 10/08 |
| | | | 322/22 |
| 2015/0367703 A1 | 12/2015 | Kubota et al. | |
| 2017/0326936 A1 | 11/2017 | Saito | |
| 2018/0156303 A1 | 6/2018 | Toyohira et al. | |
| 2018/0237023 A1* | 8/2018 | Orita | B60W 30/20 |
| 2018/0361816 A1 | 12/2018 | Ohno et al. | |
| 2019/0232748 A1 | 8/2019 | Mohamed et al. | |
| 2021/0031585 A1 | 2/2021 | Toyohira | |
| 2021/0078619 A1* | 3/2021 | Morita | B61L 15/0081 |
| 2021/0387498 A1* | 12/2021 | Furuta | B60G 17/0165 |
| 2022/0242417 A1* | 8/2022 | Berger | A61B 5/1114 |

FOREIGN PATENT DOCUMENTS

| | | |
|---|---|---|
| DE | 102007051226 A1 | 4/2009 |
| DE | 10120918 B4 | 5/2011 |
| DE | 102014016857 A1 | 6/2015 |
| DE | 102007025118 B4 | 8/2015 |
| DE | 102018002695 A1 | 10/2018 |
| DE | 102018210986 B4 | 6/2021 |
| EP | 3006238 B1 | 1/2019 |
| JP | H0858338 A | 3/1996 |
| JP | H08310214 A | 11/1996 |
| WO | 2010028792 A1 | 3/2010 |
| WO | 2020195113 A1 | 10/2020 |

OTHER PUBLICATIONS

Search Report dated Apr. 28, 2023, in corresponding European Application No. 22194655.1, 24 pages.

* cited by examiner

ACTIVE CHASSIS CONTROL FOR A MOTOR VEHICLE

FIELD

The invention relates to an active chassis control for a motor vehicle.

BACKGROUND

In general, active or semi-active chassis systems are known in which active or semi-active forces can be generated in the wheel suspension via force-introducing or force-influencing elements in the suspension or damping system. This makes it possible, on the one hand, to compensate for unevenness in the road, such as bumps in the road, and to keep the vehicle body steady. Semi-active systems are used as so-called damper controls in series production across all manufacturers. The active and semi-active systems are generally referred to as controlled chassis.

The control objective of controlled chassis is to reduce the body vibrations during driving, i.e. to calm the vehicle body over a wide range. Here, a distinction is essentially made between two frequency ranges that are relevant for passenger comfort, namely a low-frequency range of 0.5 Hz-3 Hz, i.e. the natural frequencies of the body (body vibration), and a high-frequency range of 3 Hz-20 Hz, namely the insulation range, Secondary Ride (ride comfort).

The chassis control is aimed at minimizing the vibrations in the range of natural frequencies of the body without impairing the ride comfort. In order to achieve this, different control concepts are known in which the body control calculates control signals that have to act on the vehicle body in order to achieve the control objectives.

The subjective feeling of the vehicle occupants when body vibrations are present and thus the importance of damping body vibrations that occur is strongly dependent on the driving speed. The following has been shown: In the lower speed range of the vehicle, the low-frequency body vibrations (0.5 to 1.3 Hz) are perceived by the vehicle occupants as unproblematic, while high-frequency vibrations in the range of 3 to 20 Hz, i.e. in the insulation range, secondary ride, ride comfort), which result from the ride process, impair the subjective feeling of the vehicle occupant. Conversely, when the vehicle is traveling at high speeds, low-frequency body vibrations (0.5 to 1.3 Hz) impair the subjective perception of the vehicle occupants, while high-frequency vibrations (3 to 20 Hz), which reduce ride comfort, are perceived as unproblematic by the vehicle occupants. In order to meet this requirement, according to the prior art, the control signals generated in the body control are multiplied by a driving speed-dependent factor. This factor is small at low speeds (for example 0.5 at less than 60 km/h) and large at high driving speeds (for example 1 at more than 130 km/h).

A generic chassis control has an adaptive control circuit for reducing body vibrations of the motor vehicle. A control unit is integrated into the control loop, which controls a chassis actuator as a function of a current body vibration or a parameter that correlates therewith. An adaptive unit is connected downstream of the control unit, which adapts an actuating signal generated by the control unit with a vehicle speed-dependent scaling factor, to be precise with the formation of an adapted actuating signal with which the chassis actuator can be controlled. The driving speed-dependent scaling factor can be determined in a signal generation unit as a function of the current driving speed. The following applies: as the scaling factor increases, the damping effect of the chassis actuator for damping the body vibrations increases while at the same time reducing the ride comfort. Conversely, as the scaling factor decreases, the body vibration damping effect of the chassis actuator is reduced while the ride comfort is increased at the same time.

If the control signals generated in the control unit are only scaled or adapted via the driving speed, a conflict of objectives arises between the body vibrations and the ride comfort, especially in the lower speed range (for example when driving through urban areas). In order to still be able to sufficiently dampen the body in the case of rarely occurring higher excitations, the scaling factor of the prior art must still be sufficiently large, which, however, impairs the ride comfort in the lower speed range. A further reduction in the scaling factor would increase the ride comfort again significantly. However, in the case of rarely occurring higher excitations, the body could no longer be adequately dampened.

SUMMARY

The object of the invention is to provide an active chassis control in which the driving comfort can be increased in a simple manner compared to the prior art.

The invention is based on an active chassis control with an adaptive control loop, with which body vibrations of the vehicle can be reduced. A control unit (i.e. body control) is integrated in the control circuit. Depending on a current body vibration or a parameter that correlates with it, this unit controls a chassis actuator. A control signal required for vibration compensation of the body vibration is generated in the control unit. The control unit is followed, along the signaling path, by an adaptive unit, which adapts the control signal generated in the control unit with a scaling factor that is dependent on the driving speed. This results in an adapted actuating signal with which the chassis actuator can be controlled. The driving speed-dependent scaling factor can be determined in a signal generation unit as a function of the current driving speed. The following applies: As the scaling factor increases, the damping effect of the chassis actuator for damping the body vibrations increases while at the same time reducing the ride comfort. In the same way, as the scaling factor decreases, the damping effect of the chassis actuator is reduced while the ride comfort is increased at the same time. According to the characterizing part of claim 1, an evaluation unit is assigned to the signal generation unit. With the help of the evaluation unit, the scaling factor can be temporarily increased during driving operation depending on the situation, for example when driving over a bump in the road, which results in significantly greater body vibration. The adapted control signal can thus be dimensioned in such a way that the chassis actuator can achieve effective vibration damping of the significantly greater body vibration.

Such a temporary increase in the scaling factor can be carried out as follows: the evaluation unit determines an additional factor allowance if there is significantly greater body vibration. The factor allowance can be added to the driving speed-dependent scaling factor, namely by forming a scaling factor that can be read into the adaptive unit in order to effectively dampen the significantly greater body vibration.

In this way, a significantly reduced scaling factor compared to the prior art can be provided in normal driving operation, particularly in the lower speed range. In the lower speed range, the body vibration (which is unproblematic for the vehicle occupants) is therefore less damped. However, this is done in favor of a significantly increased ride comfort.

On the other hand, if there is no significantly greater body vibration, the evaluation unit does not determine a factor allowance. In this case, therefore, the scaling factor read into the adaptive unit corresponds to the scaling factor dependent on the driving speed.

The essence of the invention is that the factor for scaling the control signals acting on the chassis actuator is also dependent on a measure (that is, the factor allowance) that reflects the intensity of the body vibration.

This would lead to an unfavorable vibration behavior. Because, as soon as the body vibration becomes excessive, it can be effectively dampened again by temporarily increasing the scaling factor. This makes it possible to significantly increase the ride comfort at low driving speeds and at the same time provide sufficient damping in the event of unfavorable or greater excitations. The conflict of objectives between body damping and ride comfort can thus be prevented.

Actuating signals, which serve to calm the body vibrations, are calculated in a body control of any design (hereinafter referred to generally as a control unit). These signals are scaled or adapted using a scaling factor that is yet to be determined and made available to the chassis actuators, which set the scaled or adapted control signals according to their physically possible system limits.

In contrast to the prior art, the characteristic curve for scaling the control signals is expanded in two dimensions: on the one hand, a measure for determining the intensity of the body vibration is included; on the other hand, a holding element or timer is provided. If the body vibration is low (i.e. during normal driving), the scaling factor is significantly reduced in the low speed range. If a significantly greater body vibration is detected, the scaling factor is increased and maintained until the body vibration is reduced again.

The challenge in determining the intensity of the body vibration is to detect it already in the first half-wave of the vibration period. Common methods aim to analyze the vibration behavior using moving averages (such as RMS) or low speed low-pass filters settings. The resulting time delay would be unacceptable for the function according to the invention, since vibrations can only be detected when several complete vibration periods have developed.

In order to detect the vibrations as early as possible, the following procedure can be carried out: The vertical body acceleration in the vehicle is measured using one or more acceleration sensors. From this, the vertical body speed is calculated by integrating the body acceleration. The signal drift that occurs during integration is removed by a high-pass filter. In addition, a low-pass filter is used to reduce noise.

The body speed filtered in this way can then be considered in terms of absolute values, since only the intensity of the body vibration and not the direction of vibration is decisive.

The filtered absolute value of the body speed is then compared with two threshold values. If the filtered absolute value of the body speed falls below a lower limit, a minimum value characteristic curve is selected as the scaling factor. If the filtered absolute value of the body speed falls below a lower limit, a maximum value characteristic curve is selected as the scaling factor. In between, the factor is linearly interpolated.

It should be noted that the minimum and maximum value characteristic curves also depend on the driving speed. Therefore, the factor follows the driving speed.

The body speed or the body acceleration follows directly the waveform of the vibration. Therefore, the scaling factor would be reduced again before the significantly greater body vibration has decayed. For this reason, the following holding logic is proposed: If the body speed increases, the scaling factor follows the body speed without delay (but taking into account the upper and lower limits). If the body speed drops again without generating a new maximum value, the factor is held at its maximum value reached within the oscillation period for a time that can be set. This ensures that the scaling factor remains increased for a complete oscillation period and is not reduced again prematurely.

Aspects of the invention are highlighted again in detail below: The size of the current body vibration can be represented by means of a parameter that correlates therewith, for example the body acceleration and/or the body speed. These can be detected with a body sensor which is assigned to the evaluation unit.

The presence or absence of a significantly greater body vibration can be determined in the evaluation unit as follows: The evaluation unit can have a comparator module in which the size of the current body vibration (or the parameter correlating therewith) is compared with a lower limit value. If the current body vibration is smaller than the lower limit value, the comparator module determines that a significantly greater body vibration is not present. In contrast to this, the comparator module determines the presence of a significantly greater body vibration if the current body vibration is greater than the lower limit value. In this case, a factor allowance is determined by the evaluation unit.

In view of a favorable control behavior, it is important that the driving speed-dependent scaling value is not suddenly increased by the factor allowance. This would lead to an unfavorable vibrational behavior. Against this background, the following signal processing can take place: In the case of a current body vibration between the lower limit value and an upper limit value, the evaluation unit can continuously adapt the factor allowance depending on the size of the current body vibration. When the upper limit value is reached, the factor allowance can assume a maximum value dependent on the driving speed. If the current body vibration is greater than the upper limit value, the factor allowance can remain unchanged at the driving speed-dependent maximum value. The driving speed-dependent maximum value can be part of a maximum value characteristic curve in which the maximum values are plotted as a function of the driving speed.

In order to effectively dampen the significantly greater body vibration, a timer can be assigned to the signal generation unit. If there is a significantly greater body vibration, the factor allowance can be added to the driving speed-dependent scaling factor over a predetermined period of time with the aid of the timer.

The period of time specified by the timer can at least correspond to the period of the significantly greater body vibration. This vibration is essentially identical to the natural vibration of the vehicle body, which is usually in the range of 1.3 Hz.

All values of the driving speed-dependent scaling factor are part of a minimum value characteristic curve. A value range is spanned between the minimum value characteristic curve and the maximum value characteristic curve, in which the values of the scaling factor read into the adaptive unit which can be determined in the signal generation unit are located.

BRIEF DESCRIPTION OF THE FIGURES

An exemplary embodiment of the invention is described below by means of the appended figures. In the figures.

DETAILED DESCRIPTION

Figure 1:
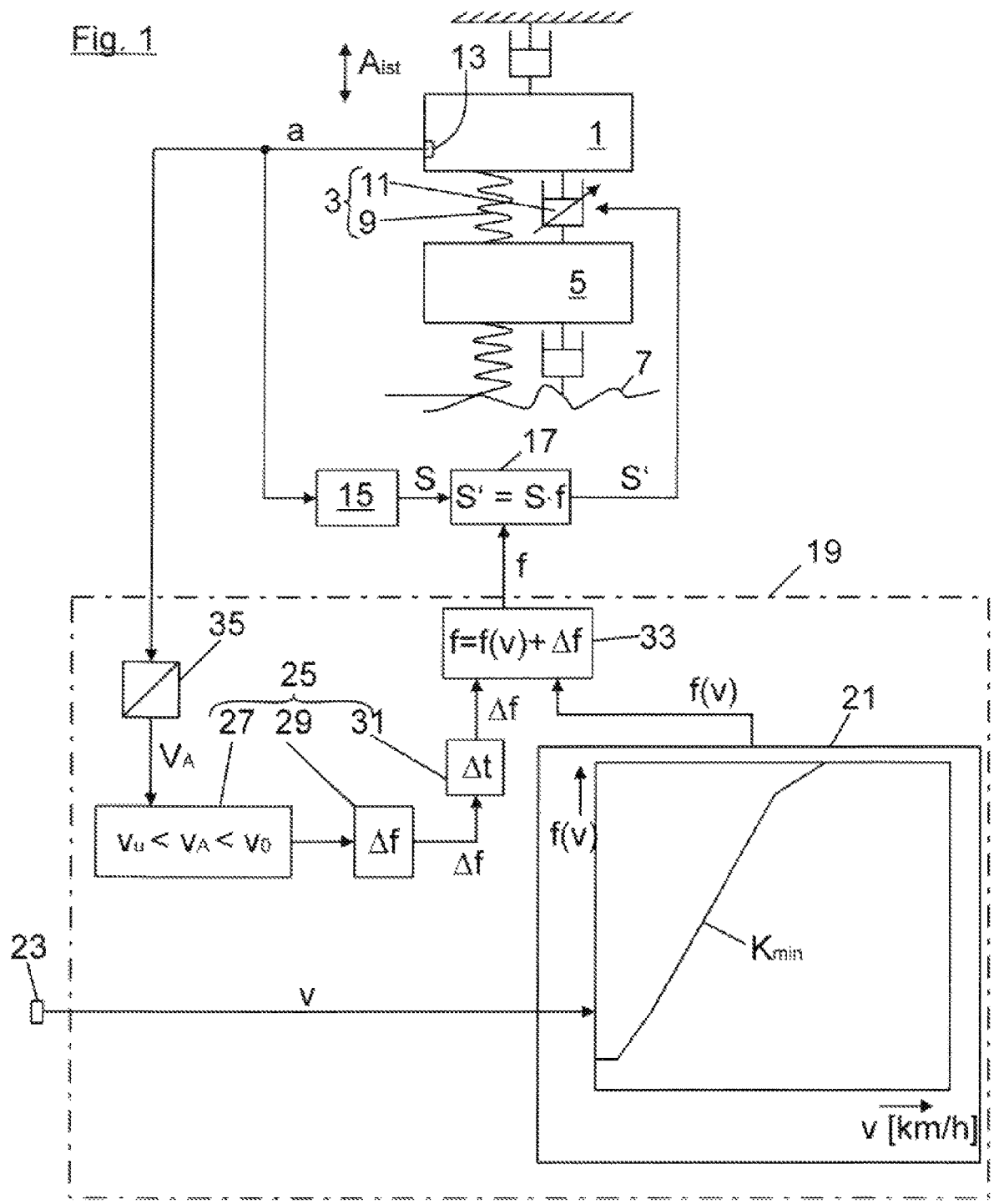
FIG. 1 shows a replacement model of a chassis of a motor vehicle with associated chassis control.

In the replacement model of FIG. 1. a vehicle body 1 is supported via a suspension/damping system 3 on a chassis, whose vehicle wheel 5 rolls on a roadway 7. The suspension/damping system 3 consists of a suspension spring 9 and an adjustable shock absorber 11, which are supported between the vehicle body 1 and the vehicle wheel 5 in FIG. 1. The controllable shock absorber 11 is integrated into an adaptive control loop, with which a body vibration $A_{actual}$ of the vehicle body 1 is reduced during driving.

For this purpose, the control circuit has a body sensor 13, which detects a body acceleration a which correlates with the current vibration $A_{actual}$. The body sensor 13 is connected to the signal input of a control unit 15 in terms of signal transmission. A control signal required for vibration compensation of the body vibration $A_{actual}$ is generated in the control unit 15. An adaptive unit 17 is connected downstream of the control unit 15 in the signal flow direction. In the adaptive unit 17, the control signal S is multiplied by a scaling factor f, specifically by generating an adapted control signal S', with which the controllable shock absorber 11 can be controlled in order to reduce the current body vibration $A_{actual}$.

The scaling factor f is determined in a signal generation unit 19. In FIG. 1, this unit has a database 21, in which a characteristic curve $K_{min}$ is stored, from which a driving speed-dependent scaling factor f(v) can be determined as a function of the current driving speed v. The current driving speed v is detected by a speed sensor 23 which is connected to the database 21 in terms of signals. In addition, the signal generation unit 19 has an evaluation unit 25. This consists of a comparator module 27, a determination module 29 and a timer 31. With the aid of the evaluation unit 25, a factor allowance Δf is determined during driving operation depending on the situation (for example when driving over a bump in the road). The factor allowance Δf is added to the scaling factor f(v), which is dependent on the driving speed, in a summing module 33, resulting in the scaling factor f, which is read into the adaptive unit 17.

In FIG. 1, a parameter correlating with the size of the detected body vibration $A_{actual}$ is present at the signal input of the comparator module 27, namely the body speed $v_A$, which follows the body vibration $A_{actual}$ and therefore oscillates approximately at the natural frequency of the body, which is, for example, at 1.3 Hz. The body speed $v_A$ is generated in a converter module 35 on the basis of the body acceleration a detected by the body sensor 13.

Figure 2:
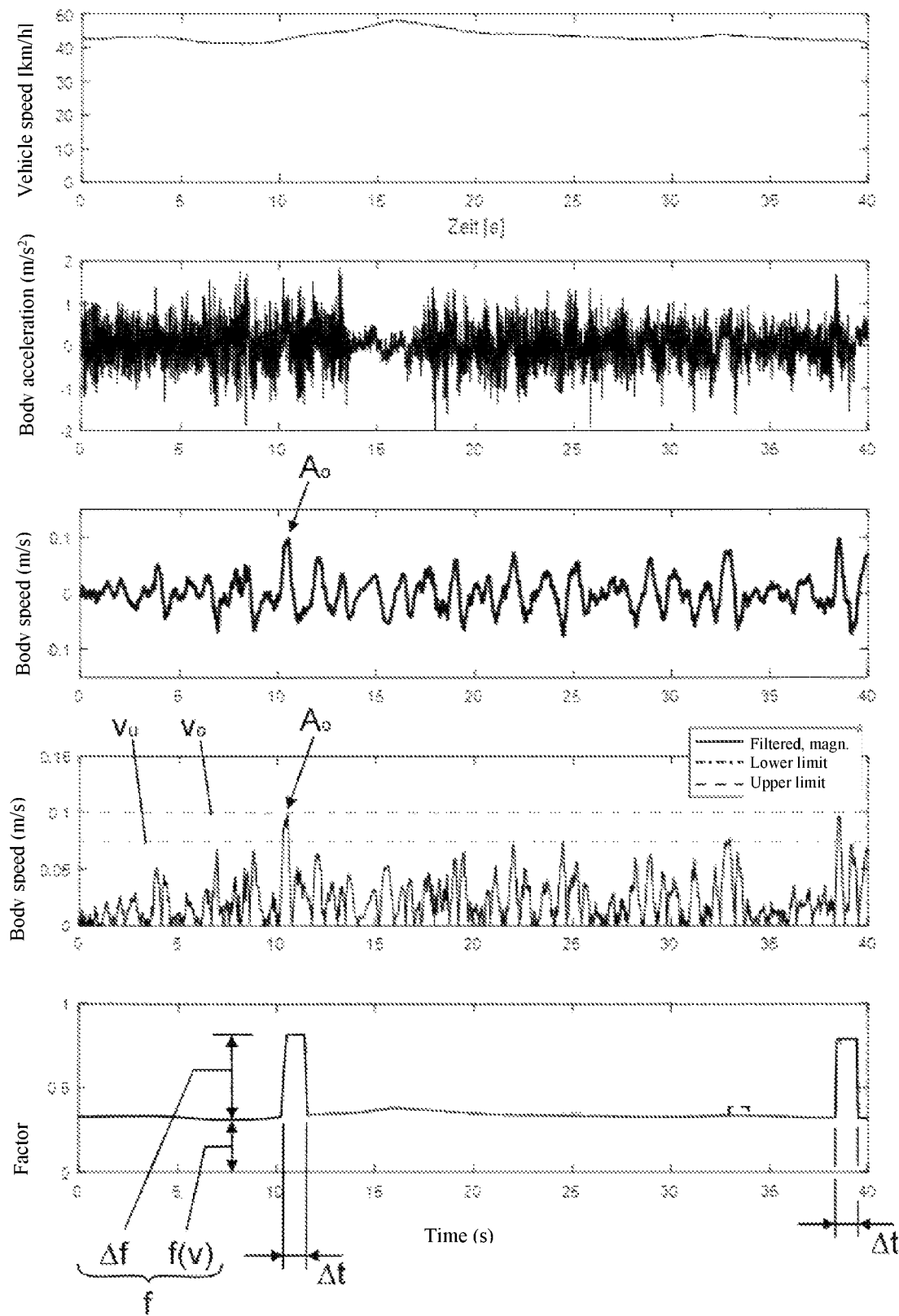
FIG. 2 shows diagrams of the time profiles of different parameters during chassis control.
Figure 3:
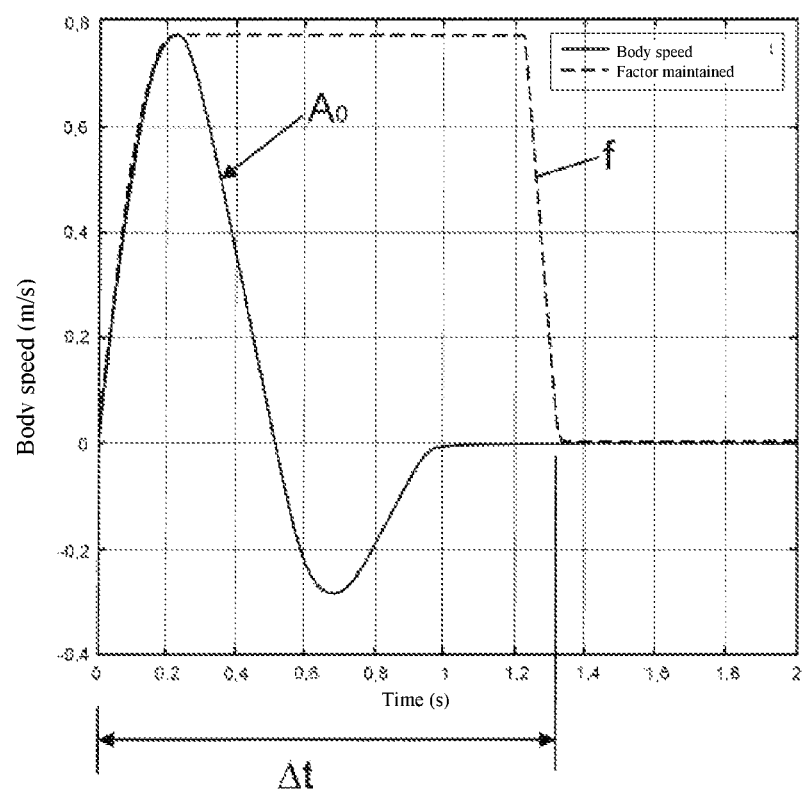
FIG. 3 shows a diagram that illustrates the damping of a significantly greater body vibration.

The body speed $v_A$ is compared in the comparator module 27 with a lower limit value $v_u$ and an upper limit value $v_o$. If the body speed $v_A$ is less than the lower limit value $v_u$, the comparator module 27 determines that there is no significantly greater body vibration $A_O$ (FIG. 2). In this case, no factor allowance Δf is determined in the determination module 29. This means that the scaling factor f read into the adaptive unit 13 is identical to the driving speed-dependent scaling factor f(v). If the current body vibration is smaller than the lower limit value $v_u$, the comparator module 27 determines that a significantly greater body vibration $A_O$ is present. In this case, a factor allowance Δf is determined in the determination module 29, which is added to the driving speed-dependent scaling factor f(v).

As long as the body speed $v_A$ is between the lower limit value $v_u$ and the upper limit value $v_o$, the factor allowance Δf is continuously adjusted in the determination module 29 as a function of the magnitude of the body speed v. When the upper limit value $v_o$ is reached, the factor allowance can assume a driving speed-dependent maximum value. If the body speed $v_A$ is greater than the upper limit value $v_o$, the factor allowance Δf remains unchanged at the driving speed-dependent maximum value.

Figure 4:
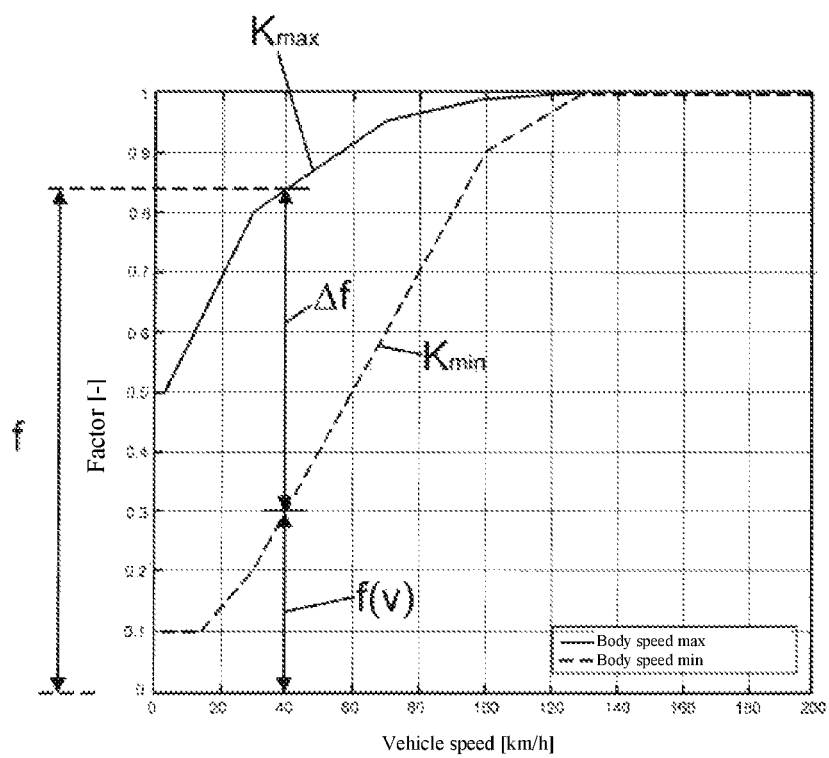
FIG. 4 shows a diagram with the maximum value characteristic and minimum value characteristic curves.

The driving speed-dependent maximum value is part of a maximum value characteristic curve $K_{max}$, which is plotted in the diagram in FIG. 4. Accordingly, the maximum values can be determined as a function of the driving speed v from the maximum value characteristic curve $K_{max}$. In the same way, all values of the driving speed-dependent scaling factor f(v) form a minimum value characteristic curve $K_{min}$. Both characteristic curves are drawn in the diagram in FIG. 4. Accordingly, a value range is spanned between the minimum value characteristic curve $K_{min}$ and the maximum value characteristic curve $K_{max}$, in which the values of the scaling factor f that can be determined in the signal generation unit 19 are located.

As an example, the chassis control at a driving speed in the low speed range of about 40 km/h (FIG. 2, first diagram from above) is explained below with reference to FIG. 2. In this case, the body sensor 13 detects a time profile of body acceleration a, which is shown in the second diagram from the top in FIG. 2. From this, the time profile of the body speed $v_A$ is calculated in the converter module 35 (see the third diagram from the top in FIG. 2). The absolute value over time is shown in the fourth diagram from the top. The absolute value over time of the body speed $v_A$ is compared in the comparator module 27 with the two limit values $v_u$ and $v_o$.

As can be seen from the time course of the absolute body speed $v_A$ (fourth diagram from the top in FIG. 4), driving takes place up to a time to on a level road surface without a bump in the road, so that there is no excessively large body vibration $A_{actual}$. The comparator module 27 therefore determines that an excessively large body vibration $A_O$ is not present. Correspondingly, the evaluation unit 25 does not generate any factor allowance Δf up to the point in time $t_0$. This means that the scaling factor f read into the adaptive unit 17 is identical to the driving speed-dependent scaling factor f(v). At a driving speed of 40 km/h this factor has a very low value of about 0.3 (see also FIG. 4). Such a low scaling factor f reduces the damping effect of the chassis actuator 11. However, the damping effect is reduced in favor of increased ride comfort, which is of great importance for occupant comfort in the low speed range, in contrast to a damping of body vibrations, which are unproblematic for the vehicle occupants in the lower speed range.

At time $t_0$, for example, a road bump is driven over with an otherwise even road surface. This leads to a significantly greater body vibration $A_O$, which is detected by comparator module 27. If the body vibration $A_O$ is present, calculation module 29 calculates a factor allowance Δf. In the present example, the factor allowance Δf is around 0.5 (cf. also FIG. 4). A scaling factor f of approximately 0.8 therefore results in summing module 33, which factor is read into the adaptive unit 17. With such a high scaling factor f, the adaptive unit 17 generates a correspondingly adapted actuating signal S', with which the chassis actuator 11 can effectively dampen the body vibration $A_0$.

If there is a significantly greater body vibration $A_0$, the factor allowance $\Delta f$ is added to the driving speed-dependent scaling factor f(v) over a predetermined period of time $\Delta t$ with the aid of the timer 31. As can be seen from FIG. 4, the period of time $\Delta t$ specified by the timer 31 is greater than the period of the significantly greater body vibration $A_0$, which essentially corresponds to the natural body vibration of the vehicle body 1.

LIST OF REFERENCE NUMERALS 1 vehicle body
3 suspension/vibration damping system
5 vehicle wheel
7 vehicle track
9 suspension spring
11 adjustable shock absorber
13 body sensor
15 control unit
17 adaptive unit
19 signal generation unit
21 database
23 speed sensor
25 analysis unit
27 comparator module
29 determination module
31 timer
33 summing module
35 converter module
$A_{actual}$ current body vibration
$A_0$ significantly greater body vibration
a body acceleration
v body speed
f(v) driving speed-dependent scaling factor
$\Delta f$ factor allowance
f scale factor
$v_u$ lower limit value
$v_o$ upper limit value
$K_{min}$ minimum value characteristic curve
$K_{max}$ maximum value characteristic curve
S actuating signal
S' adapted actuating signal
$t_0$ point in time at which a significantly greater body vibration occurs
$\Delta t$ time period

The invention claimed is:

1. An active chassis control for a motor vehicle with an adaptive control circuit for reducing body vibrations of the motor vehicle, comprising:
   a control unit which controls a chassis actuator depending on a current body vibration or a parameter correlated therewith,
   wherein the control unit is followed by an adaptive unit, which adapts an actuating signal generated by the control unit with a driving speed-dependent scaling factor by generating an adapted control signal with which the chassis actuator is controlled,
   wherein the driving speed-dependent scaling factor is determined in a signal generation unit as a function of a current driving speed such that, (1) as the driving speed-dependent scaling factor increases, a body vibration damping effect of the chassis actuator increases with a simultaneous reduction in ride comfort and (2) as the driving speed-dependent scaling factor decreases, the body vibration damping effect of the chassis actuator is reduced with a simultaneous increase in ride comfort, and
   wherein an evaluation unit is assigned to the signal generation unit and the evaluation unit determines, given a significantly greater body vibration, a factor allowance that is added to the driving speed-dependent scaling factor, specifically by generating a scaling factor with which, in the adaptive unit, the adapted actuating signal is generated in order to effectively dampen the significantly greater body vibration.

2. The active chassis control of claim 1, wherein the evaluation unit does not determine the factor allowance if there is no significantly greater body vibration, so that the scaling factor in the adaptive unit corresponds to the driving speed-dependent scaling factor.

3. The active chassis control of claim 1, wherein a size of the current body vibration is represented by correlating parameters comprising at least one of a body acceleration and a body speed, and
   wherein a body sensor is assigned to the evaluation unit which detects at least one of the body acceleration and the body speed.

4. The active chassis control of claim 1, wherein the evaluation unit has a comparator module in which a size of the current body vibration or the parameter correlating therewith is compared with a lower limit value, and
   wherein the comparator module determines an absence of the significantly greater body vibration if the current body vibration is smaller than the lower limit value, so that the evaluation unit does not determine the factor allowance.

5. The active chassis control of claim 4, wherein the comparator module determines the presence of the significantly greater body vibration if the current body vibration is greater than the lower limit value so that the evaluation unit determines the factor allowance.

6. The active chassis control of claim 5, wherein, with the current body vibration between the lower limit value and an upper limit value, the evaluation unit continuously adapts the factor allowance as a function of a magnitude of the current body vibration, and/or
   wherein, when the upper limit value is reached, the factor allowance assumes a driving speed-dependent maximum value.

7. The active chassis control of claim 6, wherein, when the current body vibration is greater than the upper limit value, the factor allowance remains unchanged at the driving speed-dependent maximum value, and
   wherein the driving speed-dependent maximum value comprises a maximum value characteristic curve, in which the maximum values are plotted as a function of the driving speed.

8. The active chassis control of claim 1, wherein a timer is assigned to the signal generation unit, and
   wherein, given the significantly greater body vibration, the factor allowance is added to the driving speed-dependent scaling factor over a predetermined period of time using the timer.

9. The active chassis control of claim 8, wherein the predetermined period of time corresponds at least to a period of the significantly greater body vibration.

10. The active chassis control of claim 7, wherein all values of the driving speed-dependent scaling factor form a minimum value characteristic curve, and
    wherein, between the minimum value characteristic curve and the maximum value characteristic curve, a value range is spanned in which the scaling factor is located.

11. The active chassis control of claim 2, wherein a size of the current body vibration is represented b correlating parameters comprising at least one of a body acceleration and a body speed, and
    wherein a body sensor is assigned to the evaluation unit which detects at least one of the body acceleration and the body speed.

12. The active chassis control of claim 2, wherein the evaluation unit has a comparator module in which a size of the current body vibration or the parameter correlating therewith is compared with a lower limit value, and
    wherein the comparator module determines an absence of the significantly greater body vibration if the current body vibration is smaller than the lower limit value, so that the evaluation unit does not determine the factor allowance.

13. The active chassis control of claim 3, wherein the evaluation unit has a comparator module in which a size of the current body vibration or the parameter correlating therewith is compared with a lower limit value, and
    wherein the comparator module determines an absence of the significantly greater body vibration if the current body vibration is smaller than the lower limit value, so that the evaluation unit does not determine the factor allowance.

14. The active chassis control of claim 2, wherein a timer is assigned to the signal generation unit, and
    wherein, given the significantly greater body vibration the factor allowance is added to the driving speed-dependent scaling factor over a predetermined period of time using the timer.

15. The active chassis control of claim 3, wherein a timer is assigned to the signal generation unit, and
    wherein, given the significantly greater body vibration, the factor allowance is added to the driving speed-dependent sealing factor over a predetermined period of time using the timer.

16. The active chassis control of claim 4, wherein a timer is assigned to the signal generation unit, and
    wherein, given the significantly greater body vibration, the factor allowance is added to the driving speed-dependent scaling factor over a predetermined period of time using the timer.

17. The active chassis control of claim 5, wherein a timer is assigned to the signal generation unit, and
    wherein, given the significantly greater body vibration, the factor allowance is added to the driving speed-dependent scaling factor over a predetermined period of time using the timer.

18. The active chassis control of claim 6, wherein a timer is assigned to the signal generation unit, and
    wherein, given the significantly greater body vibration, the factor allowance is added to the driving speed-dependent scaling factor over a predetermined period of time using the timer.

19. The active chassis control of claim 7, wherein a timer is assigned to the signal generation unit, and
    wherein, given the significantly greater body vibration, the factor allowance is added to the driving speed-dependent scaling factor over a predetermined period of time using the timer.

20. The active chassis control of claim 18, wherein all values of the driving speed-dependent scaling factor form a minimum value characteristic curve, and
    wherein, between the minimum value characteristic curve and the maximum value characteristic curve, a value range is spanned in which the scaling factor is located.

* * * * *